(12) United States Patent
Kraft et al.

(10) Patent No.: US 8,718,878 B2
(45) Date of Patent: May 6, 2014

(54) POWER MACHINE OR VEHICLE WITH POWER MANAGEMENT

(75) Inventors: Troy D. Kraft, Bismarck, ND (US); Scott N. Schuh, Fort Ransom, ND (US)

(73) Assignee: Clark Equipment Company, West Fargo, ND (US)

( * ) Notice: Subject to any disclaimer, the term of this patent is extended or adjusted under 35 U.S.C. 154(b) by 495 days.

(21) Appl. No.: 11/696,414

(22) Filed: Apr. 4, 2007

(65) Prior Publication Data
US 2008/0250259 A1    Oct. 9, 2008

(51) Int. Cl.
| G06F 7/70 | (2006.01) |
| G06G 7/00 | (2006.01) |
| G06G 7/76 | (2006.01) |
| G06F 7/00 | (2006.01) |
| G06F 17/00 | (2006.01) |
| G06F 19/00 | (2011.01) |

(52) U.S. Cl.
USPC .............................................. 701/50; 701/54

(58) Field of Classification Search
USPC .......... 701/50, 54; 60/431, 445, 449; 180/237
See application file for complete search history.

(56) References Cited

U.S. PATENT DOCUMENTS

| 4,185,521 A | 1/1980 | Beals |
| 4,189,921 A | 2/1980 | Knapp |
| 4,425,620 A | 1/1984 | Batcheller et al. |
| 4,462,210 A | 7/1984 | Pollman et al. |
| 4,474,104 A | 10/1984 | Creffield |
| 4,648,040 A | 3/1987 | Cornell et al. |
| 4,702,843 A | 10/1987 | Oswald et al. |
| 4,740,898 A | 4/1988 | McKee et al. |
| 4,893,241 A | 1/1990 | Girodat et al. |
| 4,903,792 A | 2/1990 | Ze-ying |
| 5,056,615 A | 10/1991 | Duthie et al. |
| 5,335,750 A | 8/1994 | Geringer et al. |
| 5,390,759 A | 2/1995 | Gollner |
| 6,112,842 A | 9/2000 | Ura et al. |
| 6,161,522 A | 12/2000 | Fuchita et al. ................ 123/385 |
| 6,321,866 B1 | 11/2001 | Prohaska |
| 6,644,429 B2 | 11/2003 | Evans et al. .................... 180/307 |
| 6,975,246 B1 * | 12/2005 | Trudeau ........................ 340/903 |
| 7,533,527 B2 * | 5/2009 | Naruse ............................ 60/433 |

(Continued)

FOREIGN PATENT DOCUMENTS

| EP | 0539589 | 7/1991 |
| EP | 1837509 | 9/2007 |

(Continued)

OTHER PUBLICATIONS

"Invitation to Pay Additional Fees and, Where Applicable, Protest Fee" for PCT/US2008/004329 filed Apr. 3, 2008; 6 pages.

(Continued)

*Primary Examiner* — Imran Mustafa
(74) *Attorney, Agent, or Firm* — Deirdre Megley Kvale; Westman, Champlin & Koehler, P.A.

(57) ABSTRACT

Power management control for a power machine or vehicle is disclosed. In illustrated embodiments, a user interface of the power machine or vehicle includes a power management selection for activating and deactivating power management control. In illustrated embodiments, power management control is implemented through a power management control component based upon feedback from an RPM sensor. As disclosed in illustrative embodiments, the power management control component utilizes control methods and characteristics stored in system memory to determine control input to adjust hydrostatic parameters for power management.

18 Claims, 9 Drawing Sheets

(56) References Cited

U.S. PATENT DOCUMENTS

| | | | | |
|---|---|---|---|---|
| 2001/0043721 | A1* | 11/2001 | Kravets et al. | 382/107 |
| 2004/0098984 | A1* | 5/2004 | Duell et al. | 60/431 |
| 2004/0125228 | A1* | 7/2004 | Dougherty | 348/345 |
| 2006/0077255 | A1* | 4/2006 | Cheng | 348/143 |
| 2006/0167607 | A1* | 7/2006 | Nakamura et al. | 701/50 |
| 2007/0012039 | A1 | 1/2007 | Takebe | 60/449 |
| 2007/0101708 | A1* | 5/2007 | Ohigashi et al. | 60/431 |
| 2008/0319618 | A1* | 12/2008 | Sjogren et al. | 701/50 |
| 2010/0121574 | A1* | 5/2010 | Ariyur et al. | 701/301 |
| 2010/0250022 | A1* | 9/2010 | Hines et al. | 701/2 |

FOREIGN PATENT DOCUMENTS

| | | | | |
|---|---|---|---|---|
| WO | WO 2005098148 | A1 | * | 10/2005 |
| WO | WO 2006006600 | A1 | * | 1/2006 |
| WO | WO 2006/054711 | | | 5/2006 |

OTHER PUBLICATIONS

"Notification of Transmittal of the International Search Report and the Written Opinion of the International Searching Authority, or the Declaration" for PCT/US2008/004329 filed Apr. 3, 2008; 21 pages.
Bobcat product literature—The product literature discloses a power management feature which destrokes a hydrostatic pump in response to engine speed feedback and an inching or speed control feature to set travel speed; 3 pages with portions redacted; prior to Apr. 4, 2007.
English translation of Details of Office Action dated Jun. 22, 2011 for Chinese Patent Application No. 200880011011.2, filed Apr. 3, 2008, 5 pages.
Chinese Office Action and English translation dated May 29, 2012 from Chinese Patent Application No. 200880011011.2, 14 pages.

* cited by examiner

FIG. 9

US 8,718,878 B2

POWER MACHINE OR VEHICLE WITH POWER MANAGEMENT

BACKGROUND OF THE INVENTION

Power machines, such as work vehicles, loaders or diggers include multiple hydraulic circuits that are used to drive, steer and power work functions of the machine or vehicle. For example, different power machines or work vehicles use a hydrostatic drive assembly including a hydrostatic drive pump which supplies fluid to a hydrostatic motor to operate or drive the work vehicle or machine. Additionally, hydraulic cylinders are used to implement lift, tilt or other mechanical work functions. Fluid is supplied to the hydraulic cylinders via operation of additional work pumps.

Each of the drive and additional work pumps are powered by the engine. Depending upon the work mode or function, the load on the engine can exceed power limits of the engine, causing the engine to stall. Depending upon the work application, it may be desirable to adjust different operating parameters to limit or reduce stall. The present invention addresses these and other problems and provides advantages over the prior art.

SUMMARY OF THE INVENTION

The present invention relates to power management control for a power machine or vehicle. In illustrated embodiments, a user interface of the power machine or vehicle includes a power management selection for activating and deactivating power management control. In illustrated embodiments, power management control is implemented through a power management control component based upon feedback from an RPM sensor. As disclosed in illustrative embodiments, the power management control component utilizes control methods and characteristics stored in system memory to determine control input to adjust hydrostatic parameters for power management.

BRIEF DESCRIPTION OF THE DRAWINGS

FIGS. 5-1 and 5-2 schematically illustrate embodiments of a power management selector for a user interface of a power machine or vehicle.

DETAILED DESCRIPTION OF ILLUSTRATIVE EMBODIMENTS

Figure 1:
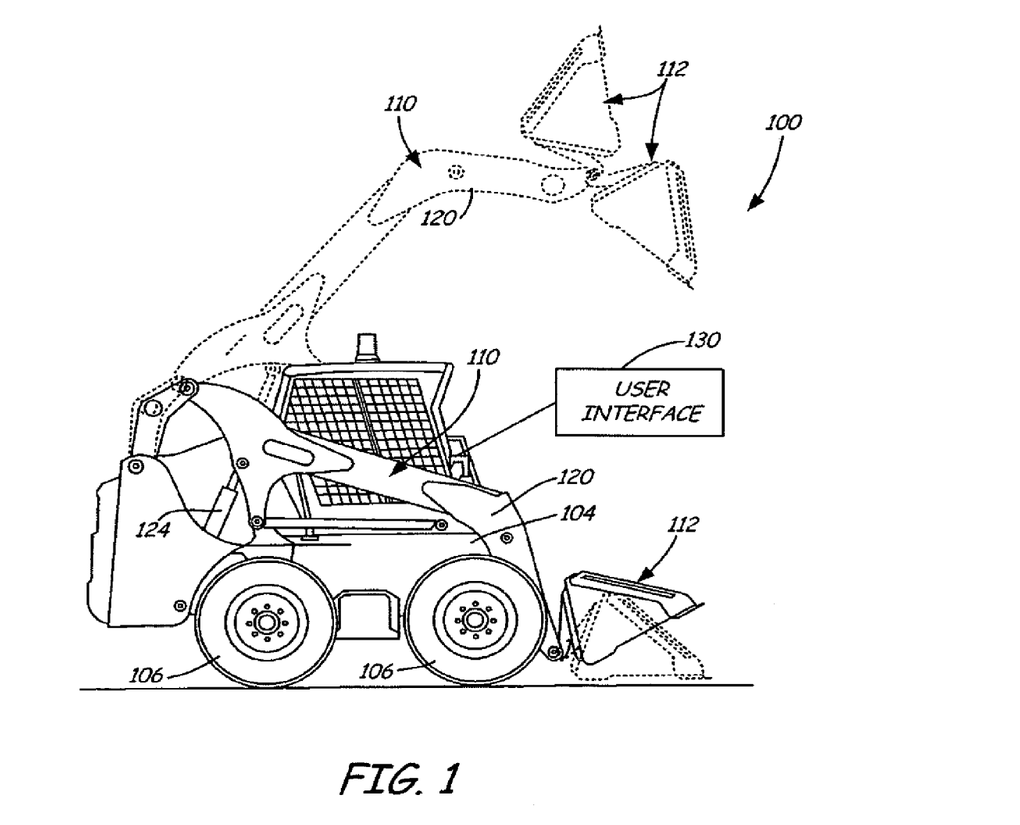
FIG. 1 is an illustrative embodiment of a power machine or vehicle.

FIG. 1 illustrates an embodiment of a power machine or vehicle 100 in which the present invention can be incorporated or used. As shown the illustrated power machine includes a body 104 that is supported relative to a frame (not shown). Wheels 106 are coupled to the frame so that the power machine 100 or vehicle can be driven over the ground during use. Application, however, of the present invention is not limited to a wheeled vehicle or loader as shown. For example, the present invention has application for a power machine, which moves along a track instead of wheels.

As shown in FIG. 1, the illustrated power machine 100 includes a lift arm assembly 110 that is used to raise, lower or position a work implement or attachment 112, (which in the illustrated embodiment is a bucket). The lift arm assembly 110 includes lift arms 120 (only one of which is shown in FIG. 1). Lift arms 120 are pivotally coupled to the body 104 of the machine to raise and lower the attachment 112. Hydraulic cylinders or actuators 124 (only one shown in FIG. 1) are coupled to the body 104 and lift arms 120 to raise and lower the lift arms 120. In FIG. 1, the lift arm assembly 110 is shown in the lowered position and shown in the raised position in phantom. The direction and speed of the vehicle is controlled through various operating controls on a user interface 130 (illustrated schematically) located in the cab or located remotely. Illustratively, the operating controls include joysticks, levers or pedals.

The attachment or implement 112 is rotationally coupled to the lift arm assembly 110 so that an orientation of the implement 112 can be adjusted relative to the lift arm assembly 110. Implement 112 is rotationally adjusted or tilted via a tilt cylinder (not shown in FIG. 1). The tilt cylinder is extended and retracted to adjust the orientation or tilt (e.g. curl or dump position) of the attachment or implement 112. Although FIG. 1 illustrates a bucket attachment or implement, application is not limited to a bucket and other implements can be attached to the lift arm assembly 110 or machine depending upon the particular work application. For example, lift arm assembly 110 of the power machine can support a spade or other implement.

Figure 2:
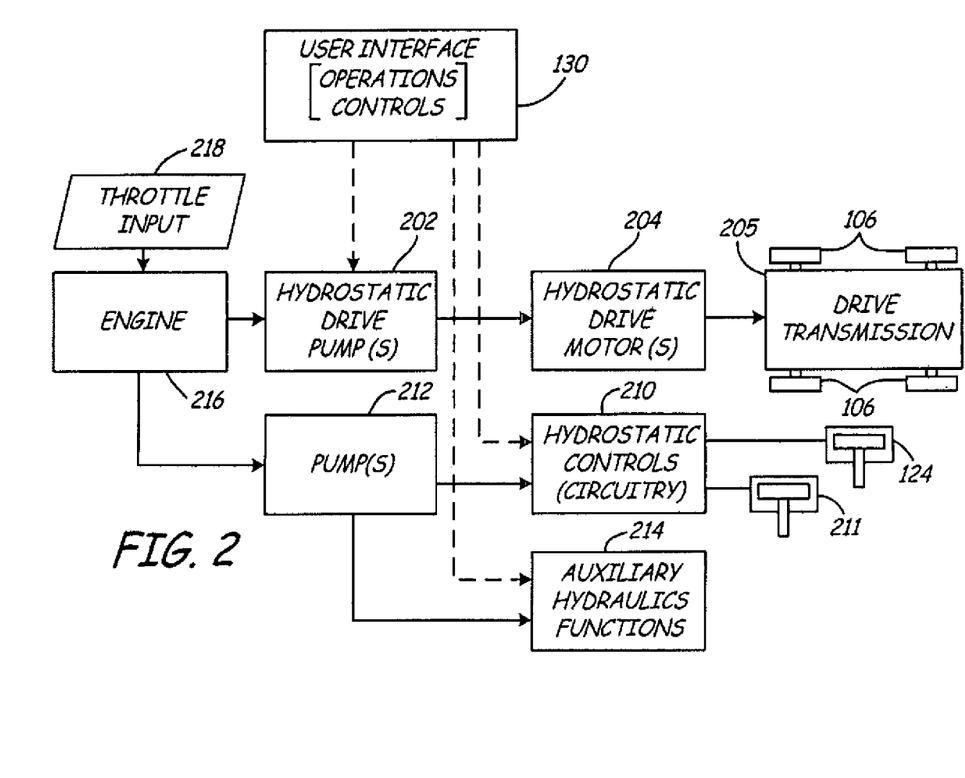
FIG. 2 is a schematic illustration of a hydraulic circuit for a power machine or vehicle of the type illustrated in FIG. 1.

As shown in FIG. 2, vehicle 100 is driven by a hydrostatic drive assembly and work functions are operated hydraulically. As shown, the hydrostatic drive assembly includes one or more or drive pumps or pumps 202 and a hydrostatic drive motor or motors 204 (both illustrated schematically). Output torque from the drive motor or motors 204 is used to rotate wheels 106 of the power machine or vehicle through a drive transmission 205.

In the embodiment shown, the hydrostatic drive pump (or pumps) 202 is a variable displacement pump having a variable flow control component (not shown) or swashplate responsive to electronic control. The magnitude and direction of fluid flow from the pump 202 is controlled through the various operating controls of the user interface 130 to impart forward and reverse motion to the vehicle or power machine. The various operating controls of the user interface 130 are operably coupled to the flow control component of the pump 202 to adjust the magnitude and direction of fluid flow to control the direction and speed of the vehicle.

As previously described, work functions of the vehicle or machine are actuated through various hydraulic circuitry. In the illustrated embodiment, the various hydraulic circuitry includes various hydraulic controls or circuitry 210 (illustrated schematically) that control fluid flow and direction to the lift cylinder 124 and tilt cylinders 211 (illustrated schematically) based on input from the operating controls of the user interface 130. Fluid is supplied to the hydraulic circuitry for lift and tilt functions via work pump 212. Additionally, in the illustrated embodiment, work pump 212 supplies fluid to auxiliary hydraulics 214 to operate auxiliary functions for more complex implements or attachments based upon input from the user interface 130.

As shown in FIG. 2, the hydrostatic drive pump(s) 202 and work pump(s) 212 are powered by engine 216. Speed (e.g. RPMS "revolutions-per-minute") of the engine 216 is controlled via throttle input 218. Excessive load on the engine can decrease output RPMs of the engine making it difficult for the engine to keep up with the power demand of the hydrostatic drive assembly and other hydraulic systems. Such excessive demand on the engine 216 via the hydrostatic drive assembly or other systems (e.g. hydraulic controls and circuitry 210 or auxiliary hydraulics 214) can cause the engine 216 to stall.

Figure 3:
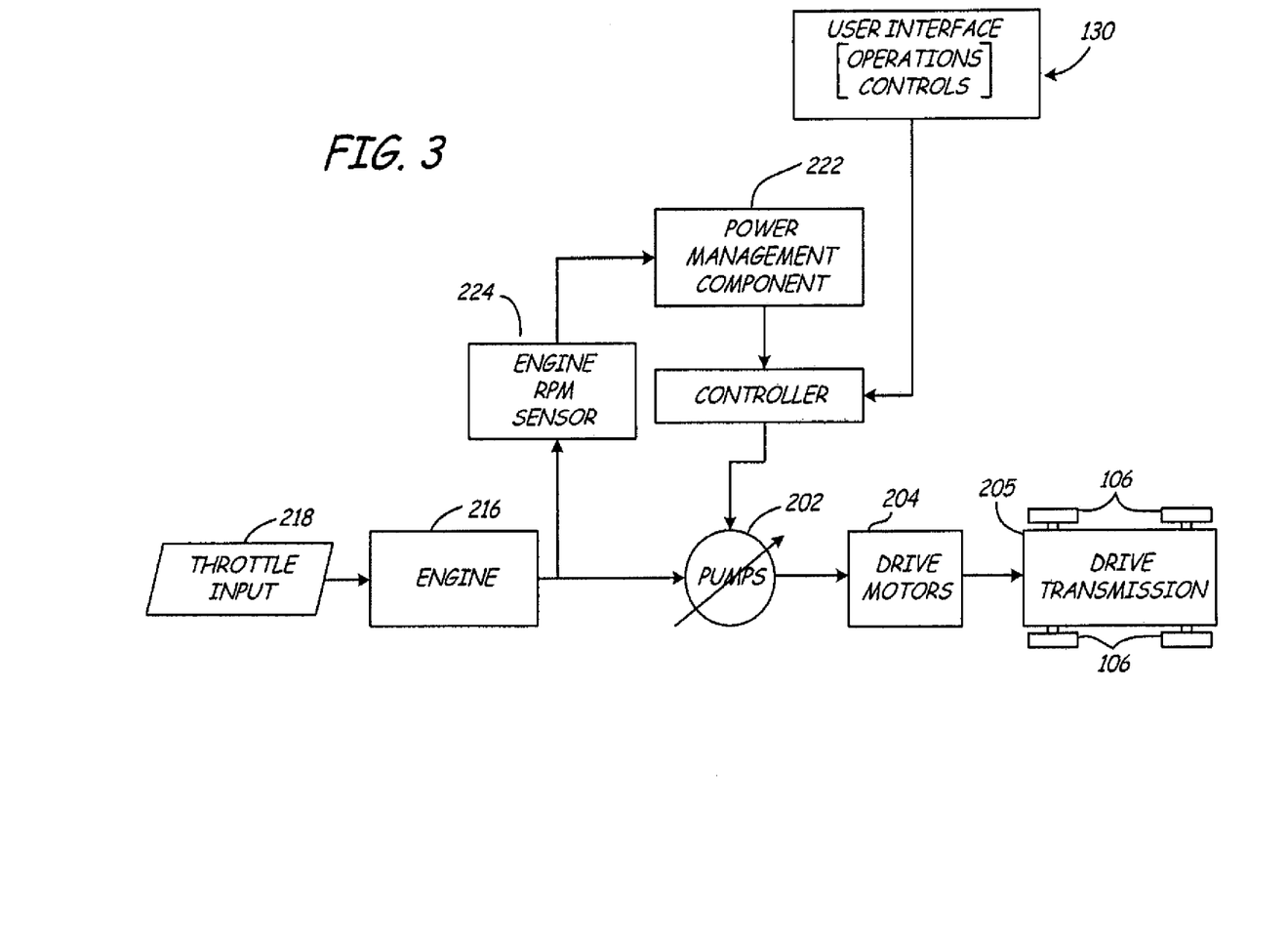
FIG. 3 is a schematic illustration of a power management control for a power machine or vehicle such as that illustrated in FIG. 1.

FIG. 3 illustrates a power management system to control engine stall in response to excessive power demand where like numbers are used to refer to like parts in the previous FIGS. In the embodiment shown, the pump 202 is a variable displacement pump having a variable flow control component or swashplate (not shown) responsive to electronic control through controller 220. As shown, the controller 220 receives input from various operating controls of the user interface 130 to adjust or control the magnitude and direction of fluid flow from pump 202.

As shown, the power management function shown includes a power management component 222 which receives engine RPMs feedback from a sensor 224 and provides a control input to the controller 220 to adjust pump stroke or displacement to control power usage based upon the feedback engine RPMs. As described, the power management component 220 receives feedback of the engine RPM to adjust pump displacement responsive to engine load or RPMs.

If there is a high demand or load on the engine 216, engine RPMs decrease. In response to a decrease in engine RPMs, the power management component 222 provides a control input to the controller 220 to adjust the flow control of the pump 202 to reduce the stroke or displacement of the pump 202 to manage power usage. In contrast, if engine RPMs are high, the power management component 222 provides a control input so that the pump can operate at stroke commanded or selected by an operator through the operating controls of the user interface 130.

In the control system shown in FIG. 3, pump stroke is automatically controlled based upon sensor feedback and operator input or commands from operating controls (e.g. joysticks). Experience users are more skilled at controlling operation of the machine and can control the machine directly without control input from the power management component or other feedback.

Figure 4:
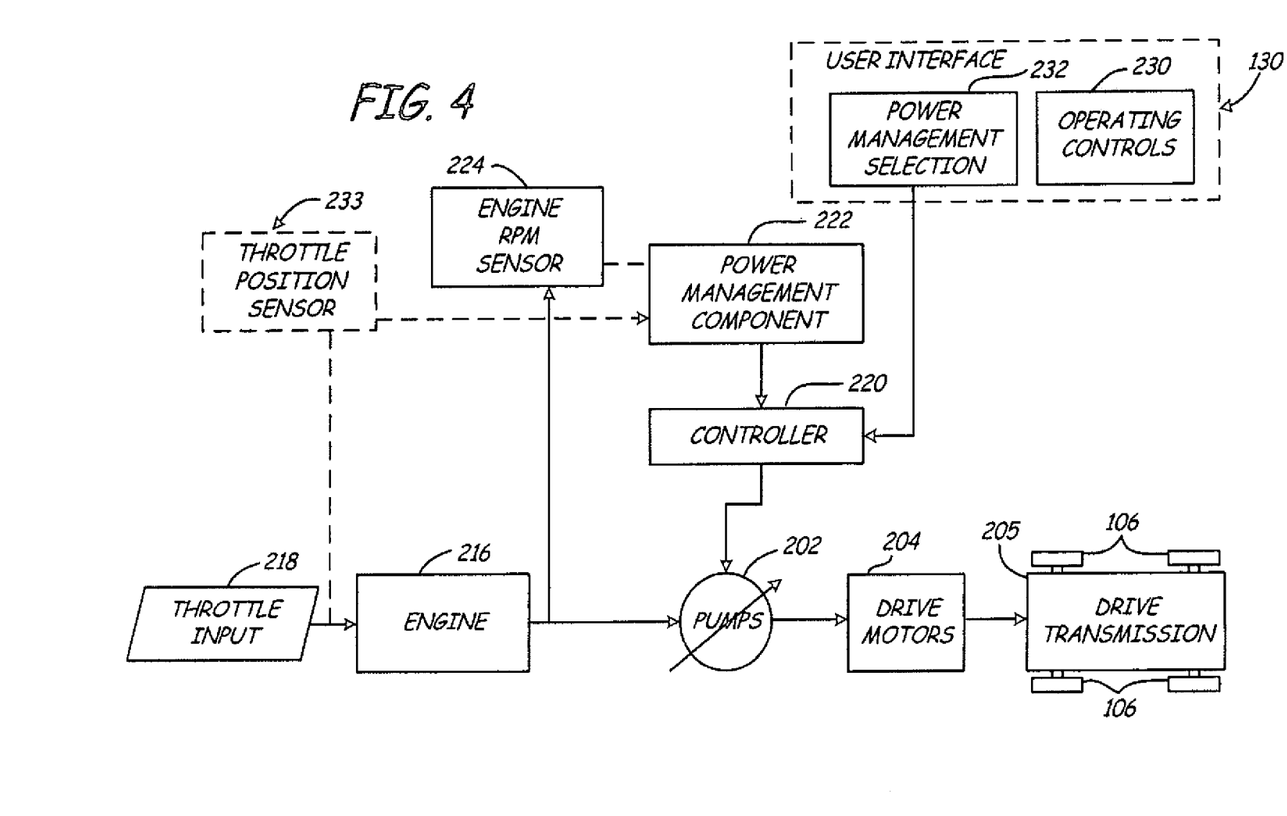
FIG. 4 is a schematic illustration of an embodiment of a user interface for a power machine or vehicle of the type illustrated in FIG. 1 including a power management selection and various operating controls.

FIG. 4 illustrates a control embodiment for a power machine where like numbers are used to refer to like parts in the previous FIGS. In the illustrated embodiment, the user interface 130 includes operating controls 230 (e.g. including various levers, pedals or joysticks) and a power management selection 232 that allows the user to activate or deactivate power management control depending upon preference or experience. When the power management selection 232 is active, the power management component 222 receives engine speed sensor feedback and provides control input to controller 220 to adjust pump stroke or displacement to control or manage power usage as previously described. When the power management selection 232 is not selected, the controller 220 adjusts displacement of pump 202 based upon operating control input without input from the power management component 222 or other feedback.

In addition to feedback from the engine RPM sensor 224, in the embodiment illustrated in FIG. 4, the power management component 222 receives input from a throttle position sensor 233 to control power usage. Input from the throttle position sensor 233 and engine RPM sensor 224 provide an indication of demand engine speed verses actual engine speed for purposes of determining power demand and controlling power management.

Figure 51:
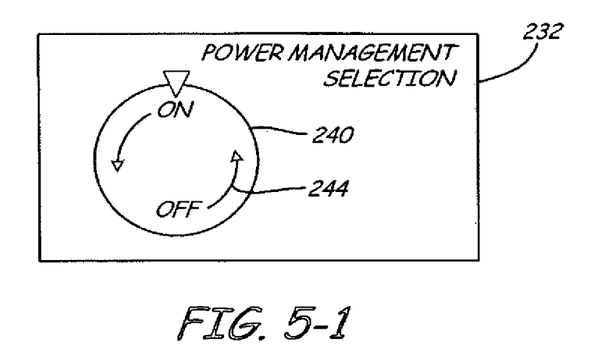
Figure 52:
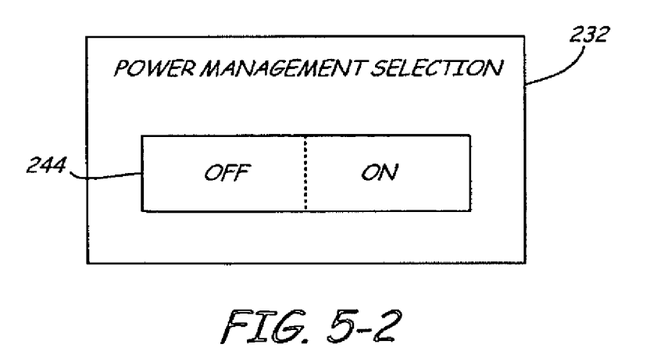

FIGS. 5-1 and 5-2 illustrate example embodiments of selectors of the user interface 130 for selecting or activating power management control. In one embodiment shown in FIG. 5-1, the selector includes a rotatable selector dial 240 having a plurality of indicia including "on" indicia for activating power management control and "off" indicia for no control. Dial 240 is rotatable as illustrated by arrow 244 between multiple positions including the "on" position (as indicated by "on" indicia) to enable power management and "off" position (as indicated by "off" indicia). In the "off" position, the controller 220 does not use engine speed sensor feedback to control hydrostatic drive functions.

In another embodiment, as schematically illustrated in FIG. 5-2, the selector includes a selector switch or toggle 254 having an "on" position and an "off" position. In the illustrated embodiment in the "on" position, power management is active and the controller 220 receives control input from the power management component 222 to manage power usage. In the "off" position, power management component 222 does not modify control input based upon engine speed feedback as previously described. Although FIGS. 5-1 and 5-2 illustrate various selectors for power management selection, application is not limited to the particular embodiments shown and other selector devices can be used as will be appreciated by those skilled in the art.

Figure 6:
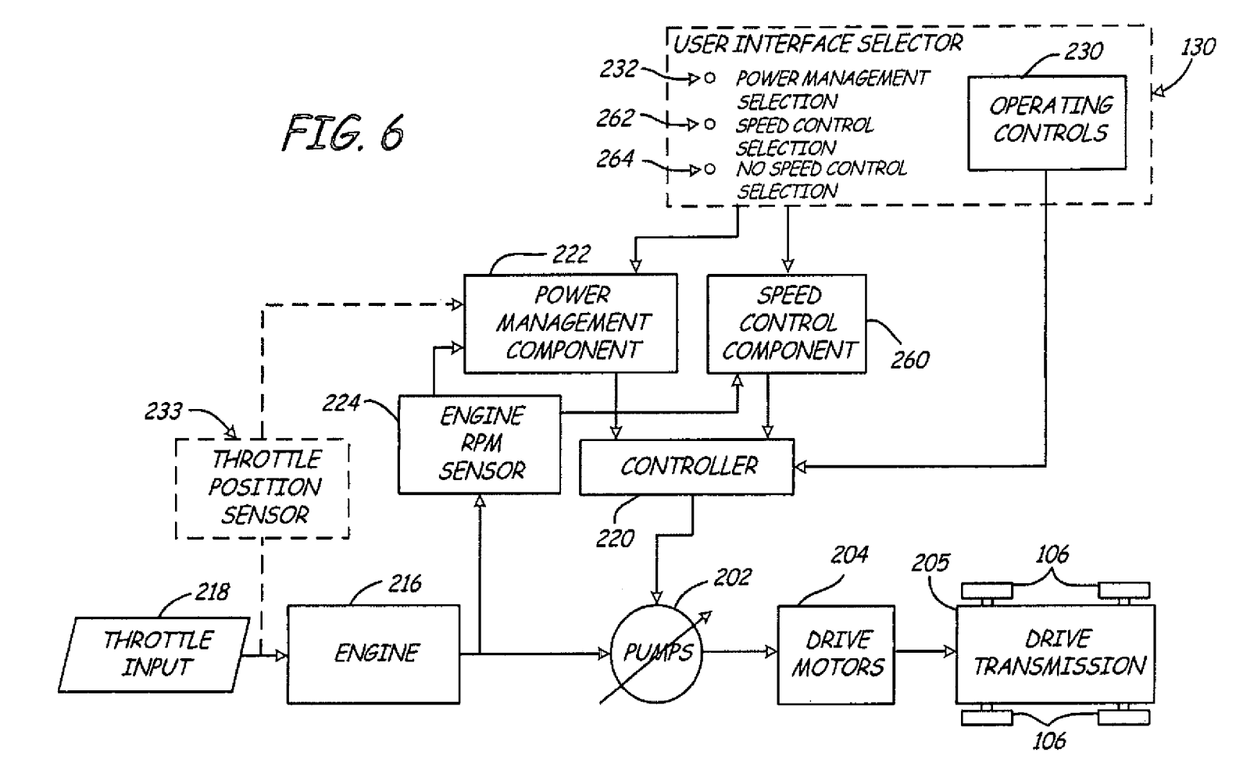
FIG. 6 is a schematic illustration of a control embodiment including power management and speed control.

FIG. 6 schematically illustrates a control system including a plurality of control modes. In the embodiment shown, the system includes power management control implemented through the power management component 222 and speed control implemented through a speed control component 260. As shown, the user interface 130 includes a power management selection 232, a speed control selection 262 and a no control selection 264.

As previously described, the power management selection activates power management control. The speed control selection 262 activates a speed control mode. As shown in the speed control mode, the speed control component 260 receives feedback from the engine RPM sensor 224 and is configured to determine a control input to the controller 220 to maintain or control speed. The controller 220 uses the control input from the speed control component 260 to adjust or control pump displacement or stroke to maintain a set speed defined by user input via the operating controls 230. Upon activation of the no control selection 264, the controller receives input from operating controls 230 but does not modify control input based upon feedback from sensors through the power management component 222 and/or speed control component 260.

Figure 7:
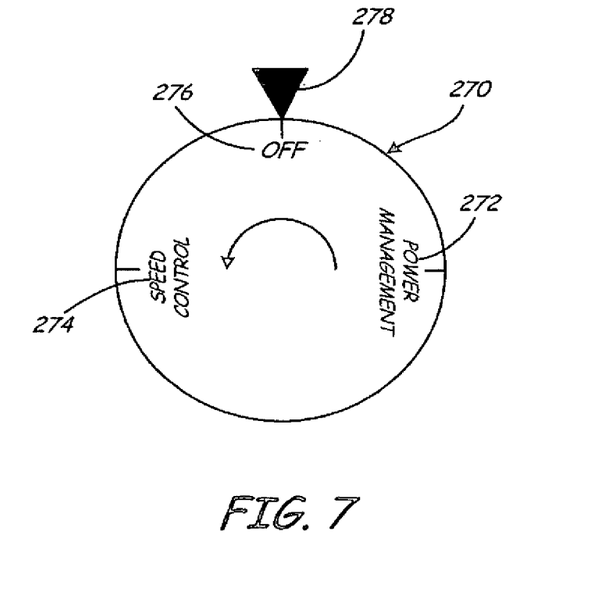
FIG. 7 illustrates an embodiment of a selector including a power management selection, a speed control selection and no control selection.

FIG. 7 schematically illustrates an embodiment of a mode selector including a rotatable selector dial 270 for selecting power management control, speed control and no control. As shown, the rotatable selector dial 270 includes a plurality of indicia including power management control indicia 272, speed control indicia 274 and no control indicia 276 (e.g. "off"). Selection dial 270 is rotated to align the indicia corresponding to the desired control mode with a selector mark 278 or other indicia.

Figure 8:
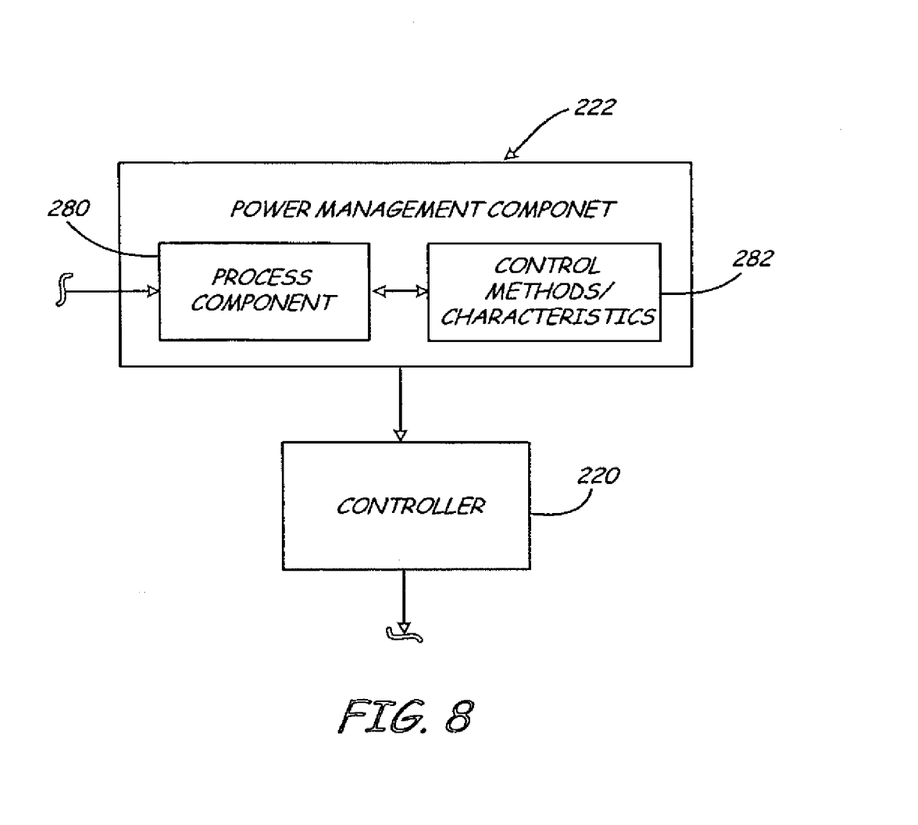
FIG. 8 illustrates an embodiment of a power management component including control methods and characteristics.

As previously described, the power management component 222 is configured to receive feedback from sensors 224 and 233 and output control input to controller 220 to manage power usage. In an illustrated embodiment shown in FIG. 8, the power management component 222 includes a process component 280 that is configured to determine control input based upon control methods or characteristic 282 stored in system memory. Illustratively, the control methods or characteristics 282 can be stored set point or control data or equations to optimize power usage or management.

Figure 9:
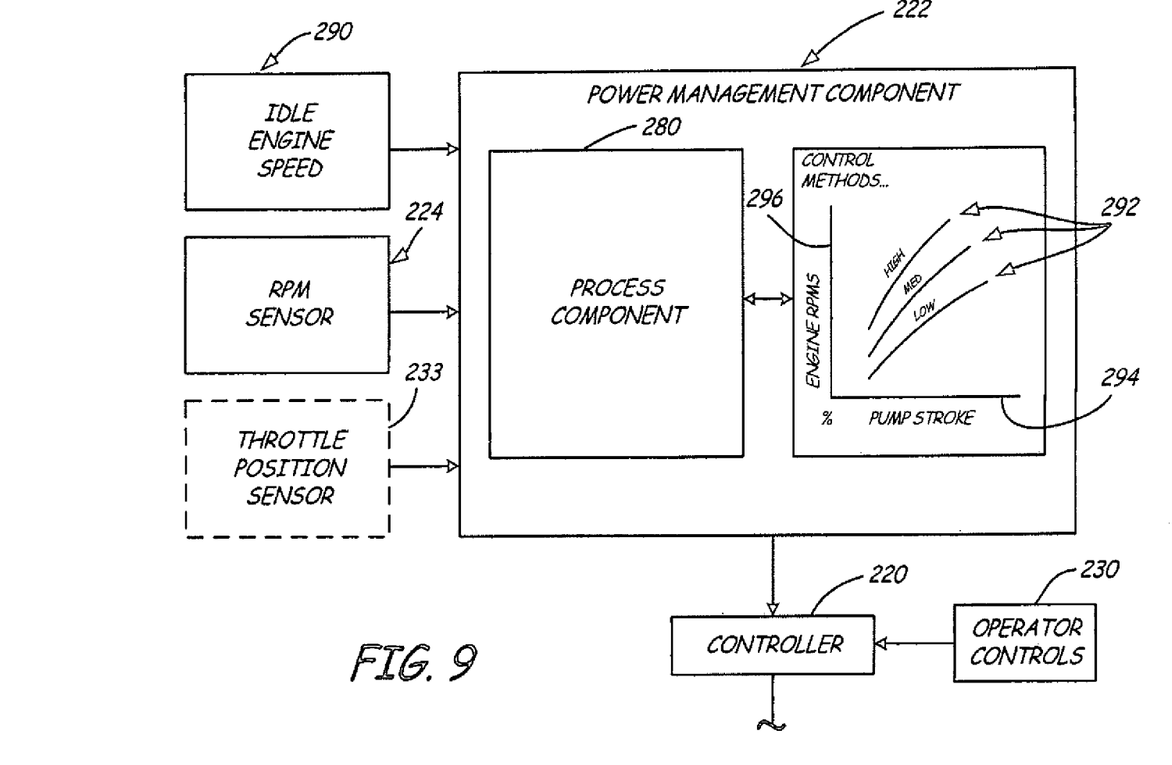
FIG. 9 illustrates an embodiment of a power management component including a plurality of control curves for different idle engine speeds.

FIG. 9 illustrate one embodiment of the power management component 222 that includes process component 280 that determines the control input based upon an idle engine speed input 290, feedback engine RPMs from sensor 224 and throttle position from throttle position sensor 233. The illustrated control characteristics in FIG. 9 includes a plurality of control curves 292 providing a set point pump stroke (as illustrated by axis 294) for different engine RPM feedback (as illustrated by axis 296) for a plurality of idle engine speeds. The control curves provide a percentage pump stroke to destroke the engine based upon feedback RPMs from the RPM sensor 224 relative to demand engine speed based upon feedback from the throttle position sensor 233. In the illustrated embodiment, the plurality of control curves 292 correspond to low, medium and high idle engine speeds 290, however application is not limited to the particular number of control curves or the embodiment shown. Thus, assuming the engine has a low idle engine speed, the process component 280 uses the low speed control curve to determine control input based upon the feedback engine RPMs from sensor 224. If the engine has a medium idle engine speed, the process component 280 uses the medium control curve to determine control input based upon feedback engine RPMS. If the idle engine speed is high, the process component 280 uses the high speed control curve to determine the control input.

In an alternate embodiment, the control characteristics or methods include various equations or graphs that the process component 280 utilizes to determine output control parameters. For example, illustratively, control equations can determine control parameters for the drive pump 202 based upon a numerical or floating point idle engine speed and not a graded (e.g. low, medium or high) idle engine speed as illustrated in FIG. 9.

Although the present invention has been described with reference to preferred embodiments, workers skilled in the art will recognize that changes may be made in form and detail without departing from the spirit and scope of the invention.

What is claimed is:

1. A control assembly for a power machine having an engine comprising:
    a control mode input device including a power management selection to select a power management control mode and a no power management selection to select a no power management control mode;
    a user input device to input a commanded pump stroke or displacement for a hydrostatic drive assembly; and
    a controller assembly configured to receive the commanded pump stroke or displacement input from the user input device and to receive one of the power management selection and no power management selection from the control mode input device to provide one of the power management control mode or no power management control mode wherein in the power management control mode the controller assembly determines, based on feedback from an engine speed sensing device whether the engine is experiencing a high demand condition, wherein the high demand condition is indicated by a drop in engine speed, wherein when the high demand condition is indicated, the controller assembly provides an output pump stroke or displacement that is reduced below the output pump stroke or displacement for the commanded stroke or displacement responsive to the feedback from the engine speed sensing device to prevent stalling of the engine and when the high demand condition is not detected, the output pump stroke or displacement is not reduced below the output pump stroke or displacement for the commanded stroke or displacement responsive to the feedback from the engine speed sensor device; and
    in the no power management control mode, the controller assembly utilizes the commanded pump stroke or displacement from the user input device to provide the output pump stroke or displacement without utilizing the feedback from the engine speed sensing device, wherein the output pump stroke or displacement is not reduced below the output pump stroke or displacement for the commanded pump stroke or displacement.

2. The control assembly of claim 1 wherein the control mode input device includes a selector including indicia for the power management selection and indicia for the no power management selection.

3. The control assembly of claim 1 wherein the control mode input device includes a speed control mode selection to select a speed control mode and in the speed control mode the controller assembly uses the feedback from the engine speed sensing device to provide the output pump stroke or displacement to maintain a set speed.

4. The control assembly of claim 3 wherein the control mode input device includes a selector having indicia to select the power management control mode, indicia to select the no power management control mode and indicia to select the speed control mode.

5. The control assembly of claim 1 wherein the controller assembly utilizes control methods and characteristics stored in system memory to reduce the commanded pump stroke or displacement responsive to the feedback from the engine speed sensing device in the power management control mode.

6. The control assembly of claim 5 wherein the control methods and characteristics include at least one control curve or data that correlates different engine speeds relative to different pump strokes or displacements and the output pump stroke or displacement is provided based upon the engine speed from the engine speed sensing device using the at least one control curve or data that correlates the different engine speeds relative to the different pump strokes or displacements.

7. The control assembly of claim 5 wherein the controller assembly receives feedback from a throttle position sensor and processes the feedback from the throttle position sensor and the engine speed sensing device to provide the output pump stroke or displacement where the output stroke or displacement is reduced below the output pump stroke or displacement for the commanded pump stroke or displacement based upon the engine speed feedback from the engine speed sensing device compared to a demand engine speed provided from the throttle position sensor using the control method and characteristics.

8. The control assembly of claim 5 wherein in the power management control mode, the controller assembly receives a demand engine speed from a throttle position sensor and the control methods and characteristics include a plurality of control curves that correlate different pump strokes or displacements for different engine speeds for a plurality of different demand engine speeds and the controller assembly uses the engine speed feedback from the engine speed sensing device to determine the reduced pump stroke or displacement in the power management control mode.

9. The control assembly of claim 8 wherein the plurality of control curves include a low, medium and high control curves corresponding to low, medium and high demand engine speeds provided from the throttle position sensor and the low, medium and high control curves provide different output pump strokes or displacements for the same engine speed.

10. The control assembly of claim 1 wherein the hydrostatic drive assembly comprises a variable displacement pump and the controller assembly is configured to interface with control methods or characteristics stored in system memory to determine the reduced pump stroke or displacement in the power management control mode.

11. The control assembly of claim 10 wherein the controller assembly receives feedback from a throttle position sensor and the control methods or characteristics include a plurality of control curves or data for a plurality of demand engine speeds where each of the plurality of control curves correlate engine speeds relative to pump strokes or displacements for one of the plurality of demand engine speeds and the controller assembly utilizes the feedback from the throttle position sensor to provide the demand engine speed to designate one of the plurality of control curves and the controller assembly utilizes the designated control curve and the feedback from the engine speed sensing device to determine the reduced pump stroke or displacement in the power management control mode.

12. The control assembly of claim 11 wherein the plurality of demand engine speeds includes a low, medium and high demand engine speeds provided from the throttle position sensor.

13. The control assembly of claim 1 wherein the user input device comprises a joystick device to input the commanded pump stroke or displacement.

14. A control assembly for controlling a drive pump in a hydrostatic drive system in a power machine having an engine that provides power to the hydrostatic drive system, comprising:
an engine speed sensing device configured to provide engine speed feedback;
a controller assembly configured to receive a commanded pump stroke or displacement input from a pump stoke or displacement input device and provide an output pump stroke or displacement to the drive pump; and
a user interface including a power management selection to select a power management control mode and a no power management selection to select a no power management control mode; and wherein when the power management control mode is selected, the controller assembly determines whether a high demand condition exists by utilizing the feedback from the engine speed sensing device to sense a drop in engine speed such that when the high demand condition exists, the controller assembly reduces the output pump stroke or displacement below the commanded pump stroke or displacement and if the high demand condition does not exist, the controller assembly utilizes the commanded pump stroke or displacement to provide the output pump stroke or displacement without any reduction in response to the engine speed feedback; and
wherein when the no power management mode is selected, the controller assembly utilizes the commanded pump stroke or displacement to provide the output pump stroke or displacement and the output pump stroke or displacement is not reduced below the commanded pump stroke or displacement.

15. The control assembly of claim 14 including a throttle position sensor and the controller assembly processes feedback from the throttle position sensor and the feedback from the engine speed sensing device to reduce the output pump stroke or displacement below the commanded pump stroke or displacement according to the feedback from the throttle position sensor compared to the feedback from the engine speed sensing device in the power management control mode.

16. The control assembly of claim 14 wherein the user interface includes a rotatable dial including indicia for selecting the power management control mode and the no power management control mode.

17. The control assembly of claim 14 wherein the user interface includes a toggle switch including indicia for selecting the power management control mode and the no power management control mode.

18. The control assembly of claim 15 wherein the throttle position sensor detects a low, medium and high throttle position and the controller assembly uses control methods or characteristics having control curves corresponding to the low, medium or high throttle positions wherein the low control curve provides a different output pump stroke or displacement for an engine speed than the medium control curve for the same engine speed and the medium curve provides a different output pump stroke or displacement than the high control curve for the same engine speed and the controller assembly utilizes the feedback from the throttle position sensor to designate one of the control curves and utilizes the designated control curve to reduce the output pump stroke of displacement below the commanded pump stroke or displacement utilizing the feedback from the engine speed sensing device.

* * * * *